(12) United States Patent
Irie

(10) Patent No.: US 6,674,964 B2
(45) Date of Patent: Jan. 6, 2004

(54) VISUAL AXIS DETECTING APPARATUS

(75) Inventor: Yoshiaki Irie, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 10/152,233

(22) Filed: May 21, 2002

(65) Prior Publication Data

US 2002/0176708 A1 Nov. 28, 2002

(30) Foreign Application Priority Data

May 25, 2001 (JP) ........................................ 2001-156860

(51) Int. Cl.$^7$ .............................. G03B 17/00; A61B 3/14
(52) U.S. Cl. ............................ 396/51; 351/210; 348/78
(58) Field of Search .......................... 396/51; 351/210; 348/78

(56) References Cited

U.S. PATENT DOCUMENTS 5,708,862 A * 1/1998 Tsunekawa et al. ........... 396/51
5,745,174 A * 4/1998 Nakano ..................... 396/51 X
5,857,120 A * 1/1999 Konishi ....................... 396/51
6,456,788 B1 * 9/2002 Otani .......................... 396/51

* cited by examiner

*Primary Examiner*—W. B. Perkey
(74) *Attorney, Agent, or Firm*—Robin, Blecker & Daley

(57) ABSTRACT

Disclosed is a visual axis detecting apparatus having: a visual axis detection circuit for detecting a visual axis of an observer; an arithmetic circuit for performing an arithmetic operation of calculating a distributed state of variations of visual axis positions obtained in a plurality of visual axis detections executed by the visual axis detection circuit in a state in which the observer is observing a predetermined point, with respect to the predetermined point; a determination circuit for determining a condition of the visual axis according to the result of detection by the visual axis detection circuit; and a change circuit for changing a determination process of determining the condition of the visual axis by the determination circuit, according to the distributed state of variations.

14 Claims, 15 Drawing Sheets

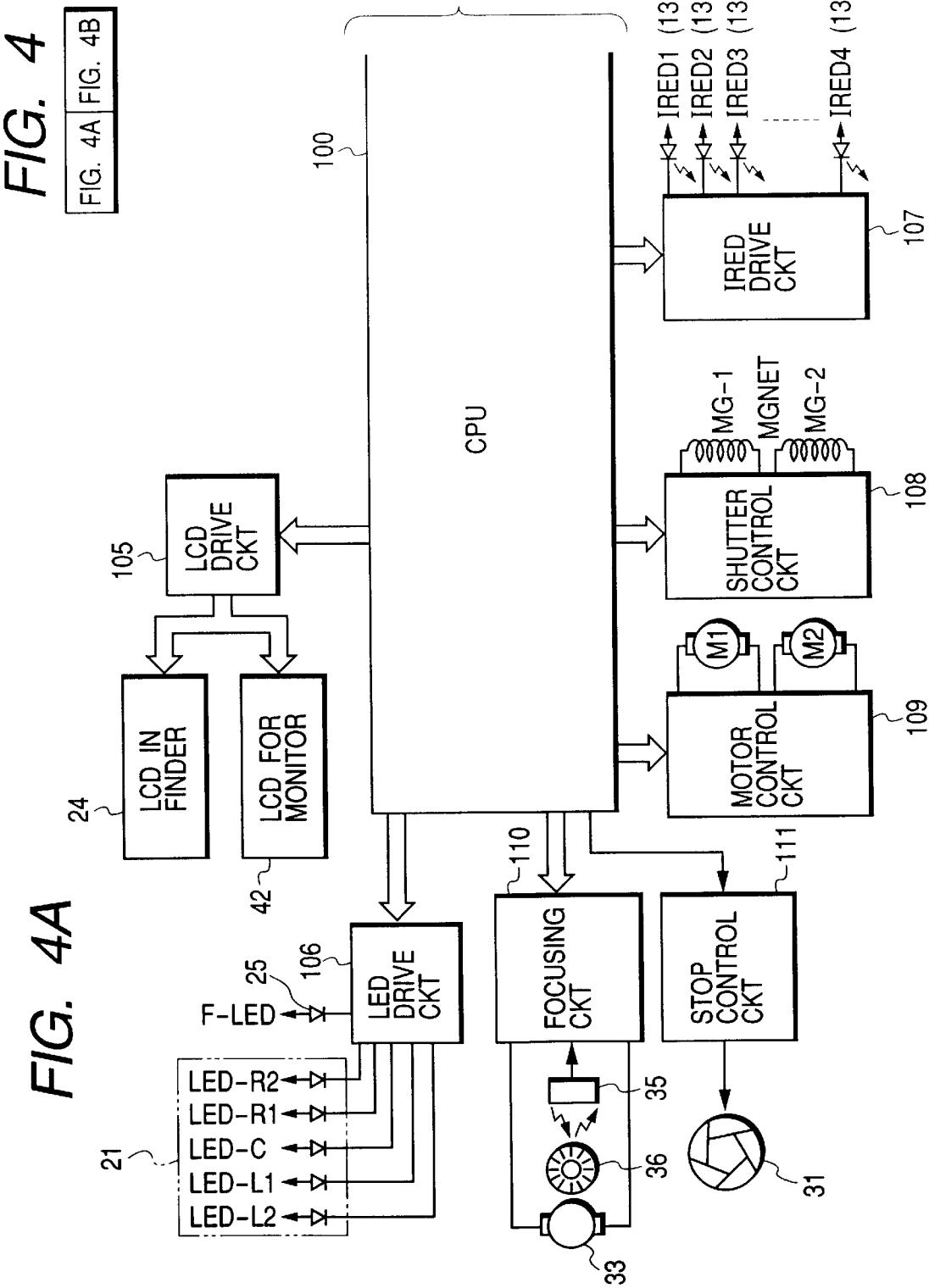

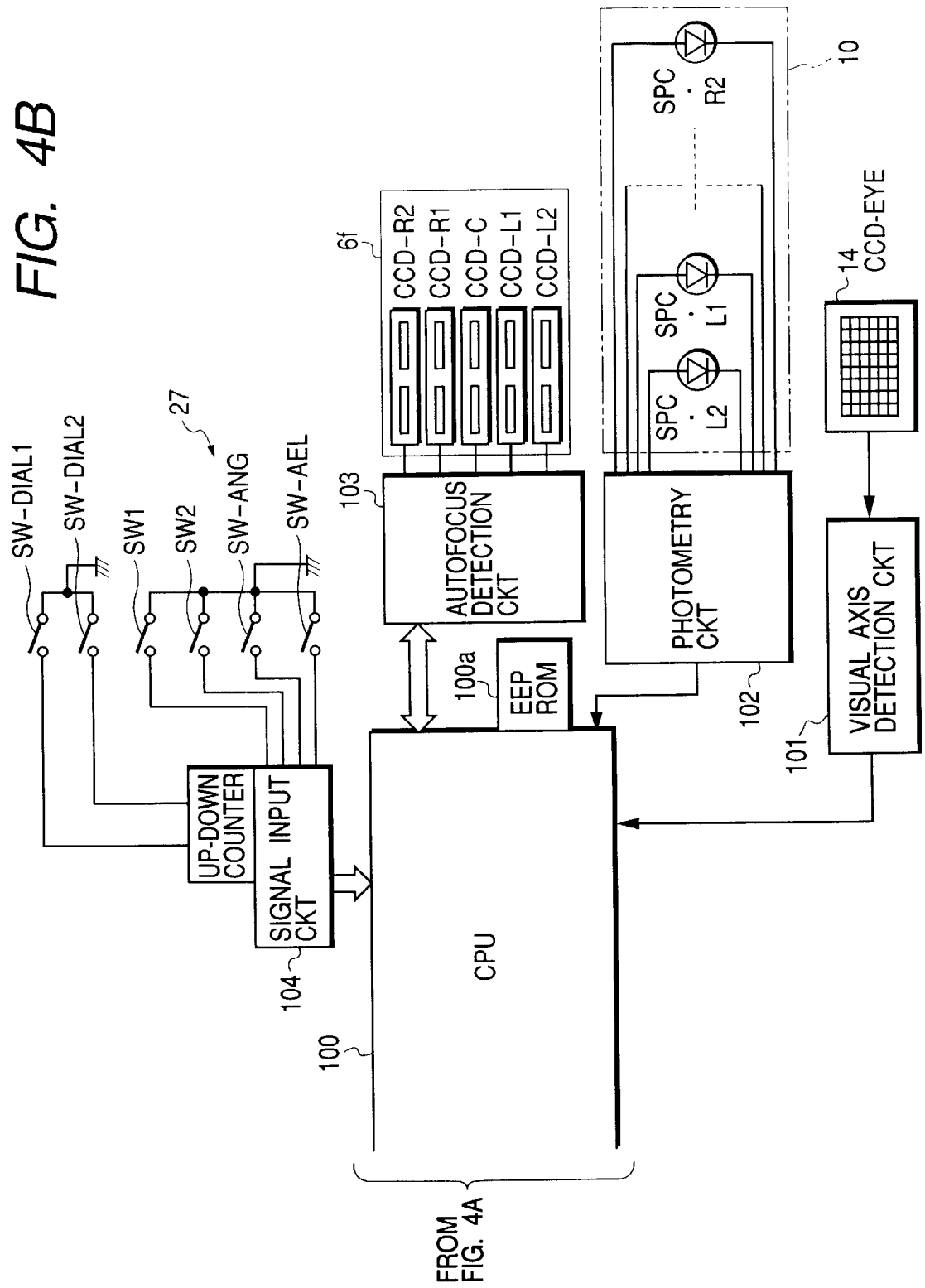

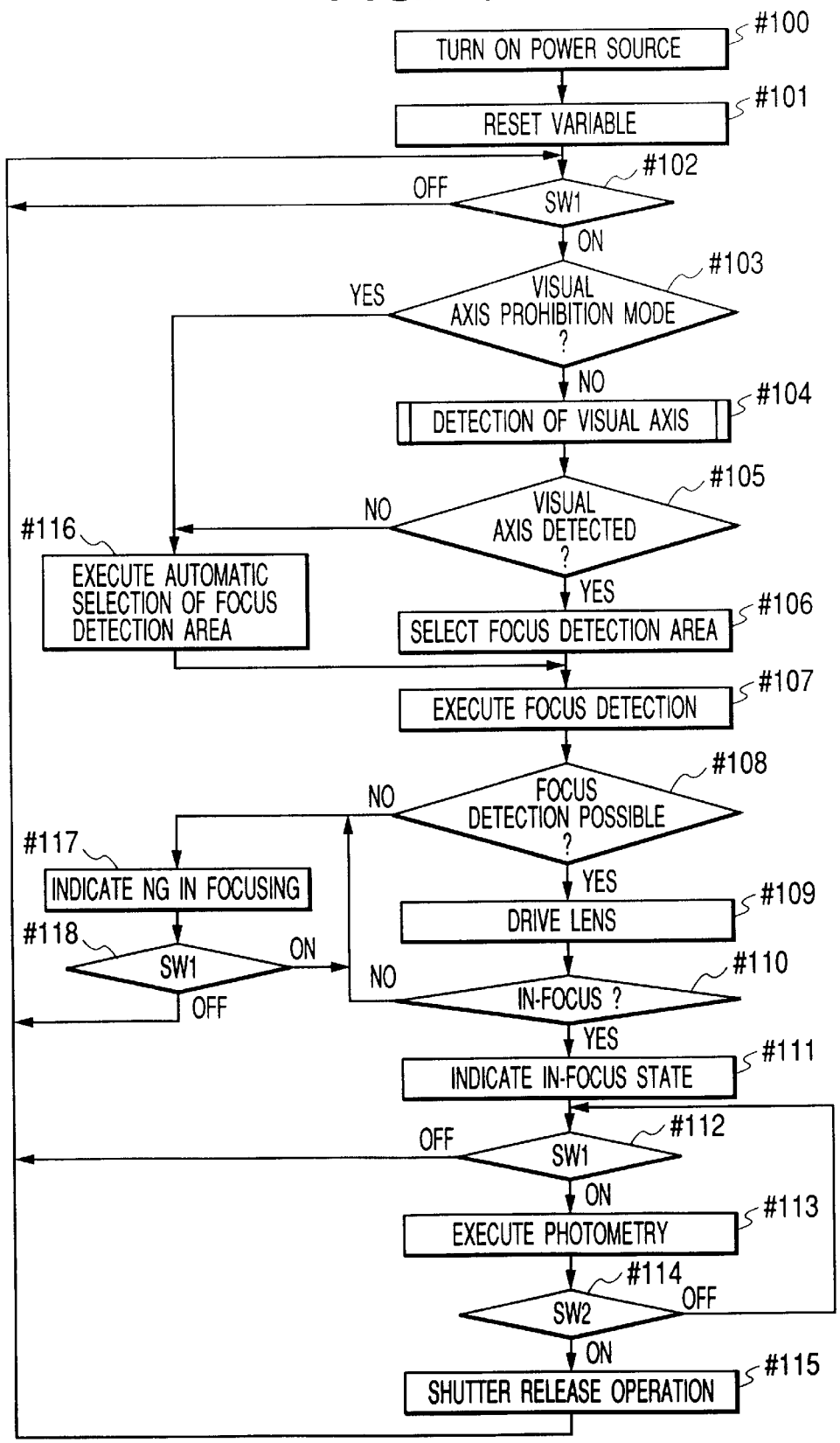

GAZING POINT (ANGLE OF ROTATION)
DISTRIBUTION-1
STANDARD DEVIATIOIN X=0.39 Y=0.59
(UNIT IN COORDINATE SYSTEM: DEGREE)

GAZING POINT (ANGLE OF ROTATION)
DISTRIBUTION-2
STANDARD DEVIATIOIN X=0.85 Y=1.38
(UNIT IN COORDINATE SYSTEM: DEGREE)

VISUAL AXIS DETECTING APPARATUS

BACKGROUND OF THE INVENTION

1. Field of the Invention

The present invention relates to improvement in visual axis detecting apparatus and optical equipment for detecting a visual axis of an observer.

2. Related Background Art

Various proposals have been made heretofore on cameras adapted to detect the direction of the visual axis of a photographer (observer) to determine which area (position) the photographer is observing in the finder field, i.e., to determine the gazing direction of the photographer by visual axis detecting means mounted in part of the camera and control various photographing functions such as autofocusing, auto-exposure, etc. on the basis of a signal from the visual axis detecting means.

For example, Assignee of the present application proposed the camera equipped with visual axis detecting means for detecting the photographer's gazing direction and automatic exposure control means having a plurality of photometric sensitivity distributions and adapted to control driving of focus detecting means and the automatic exposure control means on the basis of the output signal from the visual axis detecting means, in Japanese Patent Application Laid-Open No. 01-241511 (U.S. Pat. No. 5,486,892).

In use of any equipment with the visual axis detecting function besides the above-stated cameras, the observer gazes at an indication in an area to be selected on a display section of the equipment and this gazing action itself is a factor to make a big error in detection of the visual axis.

Namely, since the ability of gazing at a point or in a direction for a predetermined duration differs depending upon individuals, there occurred cases where a certain person was able to select an objective area but another person failed to select it though they were gazing the indication in the area to be selected on the display section of the equipment with the visual axis detecting function.

Namely, the variation in the ability of gazing at a point or in a direction for a predetermined duration was a great hurdle that anyone had to surmount in order to manipulate the visual axis detecting function.

As a solution to the above problem, Assignee proposed a technique of dividing the interior of the screen into plural areas, performing a plurality of visual axis detections, and determining a gazing point and area on the basis of frequencies and residence durations of existence of the visual axis position in the respective areas, in Japanese Patent Application Laid-Open No. 04-101126 (U.S. Pat. No. 5,857,120). Namely, the purpose of the technique is to average and stabilize the variation of the visual axis position by sampling a plurality of visual axis positions.

However, constant execution of consecutive visual axis detections necessitated some time for finally determining the visual axis position, which resulted in the drawback of deterioration of response as the visual axis detecting equipment.

Assignee of the present application proposed the camera with the visual axis detecting function adapted to select a region in a photographing field to obtain information for control of various operations of the camera on the basis of the output from the visual axis detecting means, wherein the selection areas were switched according to reliability of the output from the visual axis detecting means, Japanese Patent Application Laid-Open No. 06-308373. The number of selectable areas is switched, for example, so that the number of areas available for the selection is switched to three out of five original selectable areas when the reliability of the visual axis is low.

The reliability of the visual axis detecting means stated herein refers to the result of evaluation of the contrast of an eye image, the size of the pupil, or the positions of Purkinje images and the center of the pupil calculated. The determination of reliability of these is actually effective in the case where the eye image itself is temporarily defective for some reason. Therefore, it was not a solution to the variation of the visual axis position caused by the difference of the gazing ability originally being the physiological problem of men as described at the beginning.

SUMMARY OF THE INVENTION

An object of the present invention is to provide visual axis detecting apparatus and optical equipment permitting each user to select an intended area while minimizing influence of the variation in the visual axis position due to the individual difference of the gazing ability.

An aspect of the present invention is a visual axis detecting apparatus comprising:

a visual axis detection circuit for detecting a visual axis of an observer;

an arithmetic circuit for performing an arithmetic operation of calculating a distributed state of variations of visual axis positions obtained in a plurality of visual axis detections executed by the visual axis detection circuit in a state in which the observer is observing a predetermined point, with respect to the predetermined point;

a determination circuit for determining a condition of the visual axis according to the result of detection by the visual axis detection circuit; and a change circuit for changing a determination process of determining the condition of the visual axis by the determination circuit, according to the distributed state of variations.

Preferably, the visual axis detecting apparatus further comprises a storage circuit for storing the distributed state calculated by the arithmetic circuit, wherein the change circuit changes the number of detections by the visual axis detection circuit to a smaller number when the distributed state of variations is small, but the change circuit changes the number of detections by the visual axis detection circuit to a larger number when the distributed state of variations is large, and wherein said determination circuit determines the condition of the visual axis on the basis of the number of detections changed by the change circuit.

Preferably, the determination circuit determines that a position of the visual axis is an average position of a plurality of visual axis positions detected by the visual axis detection circuit.

Preferably, the arithmetic circuit calculates a standard deviation of a plurality of visual axis positions.

Preferably, the predetermined point is displayed on a screen.

Preferably, a plurality of zones are displayed on the screen and a zone is selected out of the plurality of zones according to the condition of the visual axis determined by the determination circuit.

Preferably, the screen is a focusing screen of a camera.

Preferably, the apparatus further comprises a mode setting member for setting a mode of performing the arithmetic operation by the arithmetic circuit and a mode of performing the determination by the determination circuit.

Another aspect of the present invention is a visual axis detecting apparatus comprising:

a screen in which a plurality of zones are formed;

a visual axis detection circuit for detecting a visual axis of an observer;

an arithmetic circuit for performing an arithmetic operation of calculating a distributed state of variations of visual axis positions obtained in a plurality of visual axis detections executed by the visual axis detection circuit in a state in which the observer is observing a predetermined point on said screen, with respect to the predetermined point;

a selection circuit for selecting one of the plurality of zones according to the result of detection by the visual axis detection circuit; and a change circuit for changing a selection process by the selection circuit according to the distributed state of variations.

Other features of the present invention will become apparent on the basis of the drawings and description of the preferred embodiments which will follow.

BRIEF DESCRIPTION OF THE DRAWINGS

FIG. 4 is comprised of FIGS. 4A and 4B are block diagrams showing an electric configuration of the single-lens reflex camera of FIG. 1;

FIG. 5 is a flowchart showing the sequential operation of the single-lens reflex camera of FIG. 1;

DETAILED DESCRIPTION OF THE PREFERRED EMBODIMENTS

The present invention will be described below in detail on the basis of the illustrated embodiments.

First, the first embodiment of the present invention will be described referring to FIG. 1 to FIGS. 11A, 11B.

Figure 1:
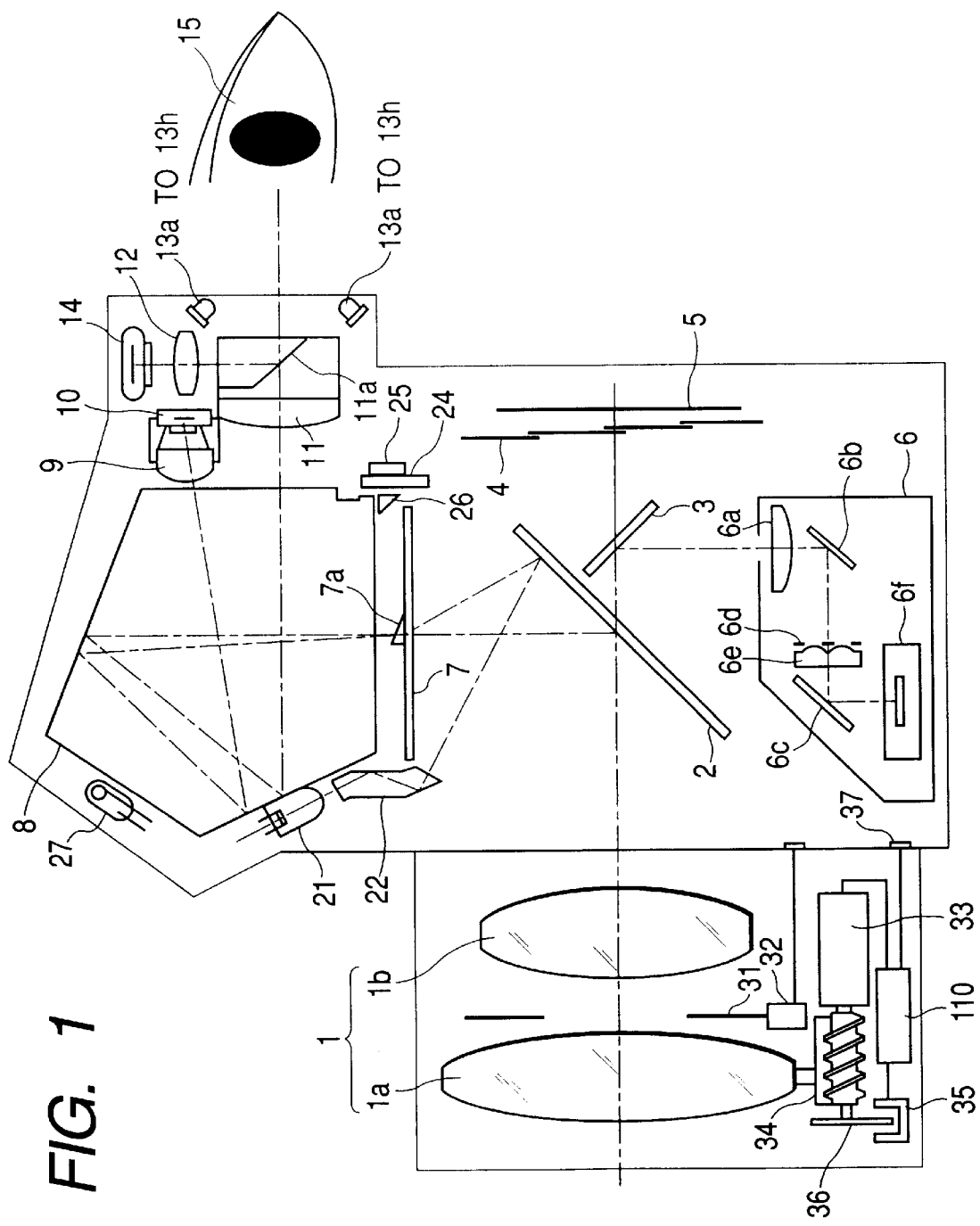
FIG. 1 is a schematic illustration of a single-lens reflex camera according to a first embodiment of the present invention.
Figure 2A:
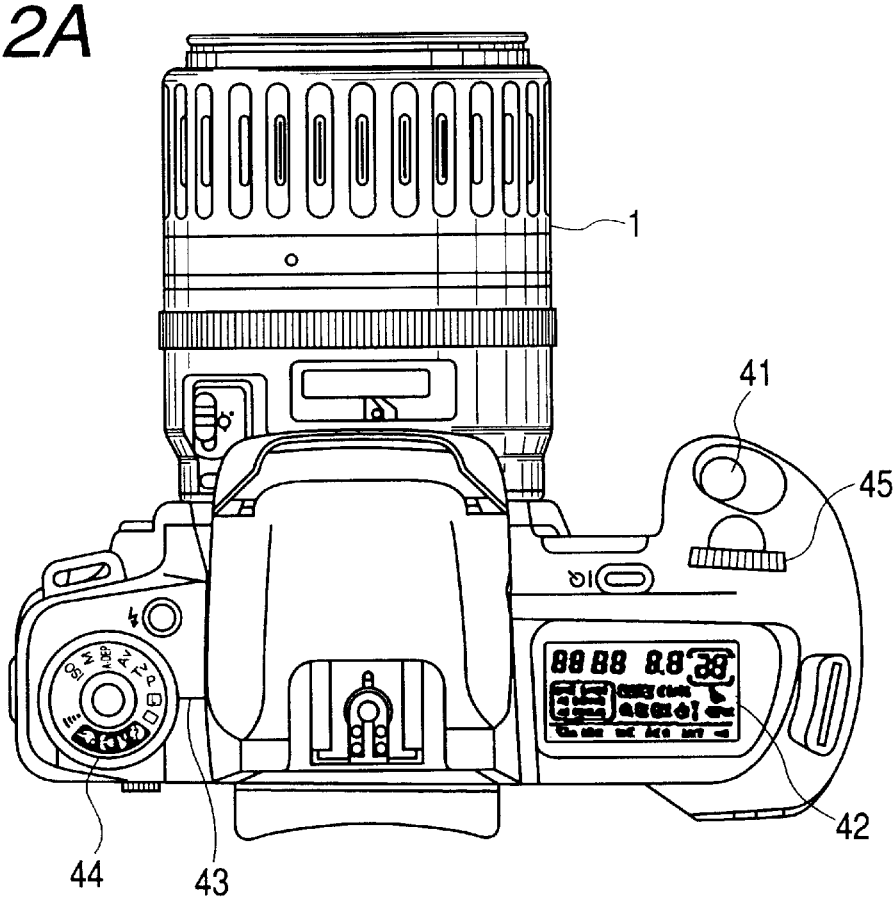
FIGS. 2A and 2B are illustrations showing a top view and a rear view of the single-lens reflex camera of FIG. 1.
Figure 2B:
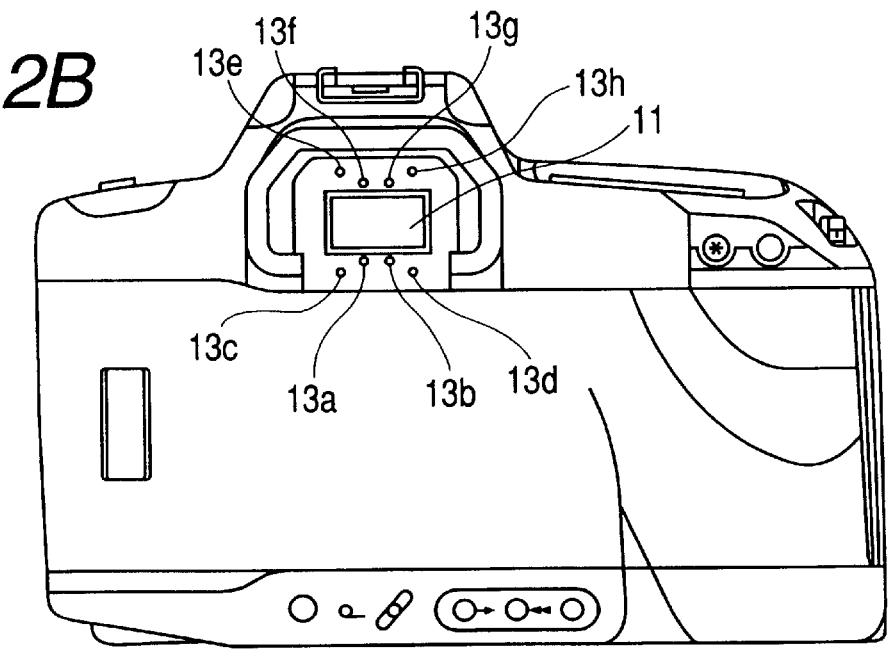
Figure 3:
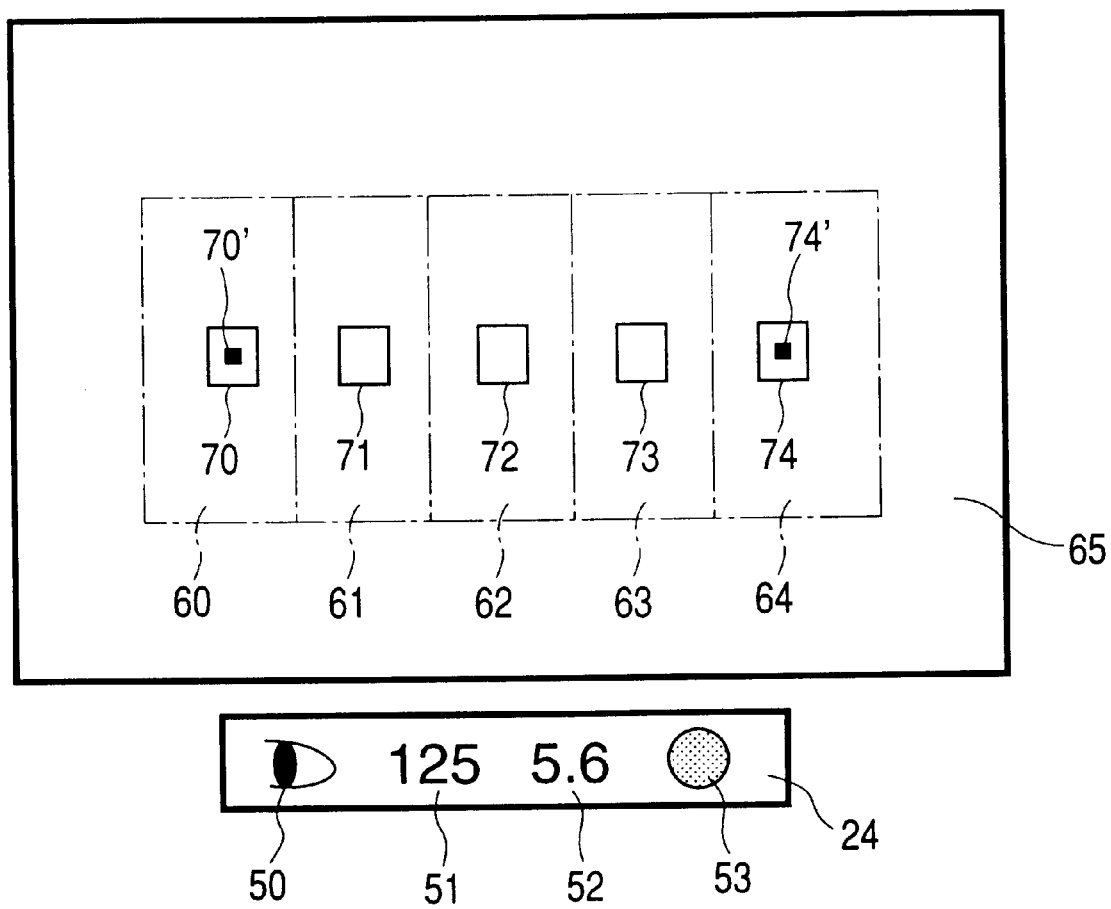
FIG. 3 is a view showing a finder field in the single-lens reflex camera of FIG. 1.

FIG. 1 is an illustration showing the structure of major part in an embodiment of application in which the present invention is applied to a single-lens reflex camera, FIGS. 2A and 2B are illustrations showing a top view and a back view of the single-lens reflex camera of FIG. 1, and FIG. 3 an illustration showing a finder view in a viewfinder of the same single-lens reflex camera of FIG. 1.

In FIG. 1, reference numeral 1 designates a taking lens, which is illustrated as a configuration of two lenses for convenience' sake, but which is actually composed of still more lenses. Numeral 2 denotes a main mirror, which is obliquely placed in or retracted away from a photographing optical path according to an observation state of a subject image through the finder system and a photographing state of the subject image. Numeral 3 represents a submirror, which reflects a beam passing through the main mirror 2, toward a focus detection device 6 located in the lower part of the camera body, which will be described hereinafter.

Numeral 4 indicates a shutter. Numeral 5 denotes a photosensitive member, which is a silver film, or a solid-state image sensing device such as a CCD or MOS type device, or an image pickup tube such as Vidicon or the like. Numeral 6 designates the focus detection device, which is composed of a field lens 6a placed near the image plane, reflecting mirrors 6b and 6c, a stop 6d, a secondary imaging lens 6e, a line sensor 6f consisting of CCDs, and so on. The focus detection device 6 in the present example is configured to detect the focus condition by the known phase difference detecting method and, as shown in FIG. 3, its focus detection areas are a plurality of zones in the field (five regions indicated by focus detection area marks 70 to 74). The focus detection device 6 is constructed so as to be able to detect the focus condition in each of the focus detection areas.

Numeral 7 represents a focusing screen placed at an intended image plane of the taking lens 1, and 8 a pentagonal prism for changing the finder-optical path. Numerals 9 and 10 are an imaging lens and a photometry sensor, respectively, for measuring the luminance of the subject in the observation screen. The imaging lens 9 establishes the conjugate relation between the focusing screen 7 and the photometry sensor 10 through the reflecting path in the pentagonal prism 8.

Numeral 11 represents an eyepiece lens 11 equipped with a light splitter 11a, which is located behind the exit side of the pentagonal prism 8. The eyepiece lens 11 is used when the photographer observes the focusing screen 7 by eye 15. The light splitter 11a consists, for example, of a dichroic mirror transmitting the visible light but reflecting the infrared light.

The finder optical system is constructed of the main mirror 2, focusing screen 7, pentagonal prism 8, and eyepiece lens 11 described above.

Numeral 12 denotes an imaging lens. Numeral 14 indicates an image sensor (CCD-EYE) consisting of a two-dimensional array of 80 pixels vertical and 100 pixels horizontal of photoelectric conversion elements such as CCDs or the like, which is positioned so as to be conjugate with the vicinity of the pupil of the photographer's eye 15 present at a predetermined position with respect to the imaging lens 12. The imaging lens 12 and the image sensor 14 (CCD-EYE) constitute a light-receiving means for detection of the visual axis. Symbols 13a to 13h denote illumination means consisting of light emitting devices for illuminating the vicinity of the pupil of the photographer's eye 15. Infrared light emitting diodes (hereinafter referred to as IREDs) are used as these light emitting devices, and are arranged around the eyepiece lens 11, as shown in FIG. 2B. A pair of two IREDs out of those 13a to 13h are selectively lit up at each time of visual axis detection.

The visual axis detection device is constructed of the light-receiving means, illumination means, and dichroic mirror 11a described above.

Numeral 21 designates high-luminance superimposing LEDs which can be recognized even in a bright subject. Light beams emitted from the LEDs 21 travel through a projection prism 22, are reflected by the main mirror 2, are bent into the perpendicular direction by a small prism array 7a provided on a display region of the focusing screen 7, and then travel through the pentagonal prism 8 and the eyepiece lens 11 up to the photographer's eye 15.

Namely, as seen from the finder field shown in FIG. 3, the focus detection area marks 70 to 74 each glow in the finder field, so as to indicate the focus detection areas (which will be referred to hereinafter as superimposed display).

In FIG. 3, dot marks 70', 74' are presented inside the left and right focus detection area marks 70, 74, and these are indexes in sampling of visual axis correction data for correction for a detection error of visual axis due to the individual difference of eye (which is referred to as calibration).

Five regions 60 to 64 indicated by dashed lines in FIG. 3 are visual-axis effective regions set for correspondence between the photographer's visual axis position calculated by detection of the visual axis and the five focus detection areas. For example, when the calculated visual axis position is present in the region 61, detection of focus is carried out by means of the CCD-L1 sensor (described hereinafter) corresponding to the focus detection area mark 71 in the region 61. The visual-axis effective regions 60 to 64 are approximately coincident with split patterns of the photometry sensor 10 shown in FIG. 1, and the photometry sensor 10 is a 6-divided sensor including an area corresponding to a peripheral region 65.

In the lower part of the finder screen of FIG. 3, numeral 51 designates a shutter speed indication segment, 52 an aperture value indication segment, 50 a visual axis input mark indicating a visual axis input state, and 53 an in-focus mark indicating an in-focus state of the taking lens 1. Numeral 24 denotes an in-finder LCD (also referred to below as F-LCD) for the indications of photography information outside the finder field, which is illuminated by an illumination LED 25.

A light beam passing through the F-LCD 24 is guided through a triangular prism 26 to the area outside the finder field, as indicated by 24 in FIG. 3, whereby the photographer can recognize various information on photography.

Referring back to FIG. 1, numeral 31 designates a stop disposed in the taking lens 1, 32 a stop driving device including a stop driving circuit 111, 33 a lens driving motor, and 34 a lens driving member consisting of a driving gear and others. Numeral 35 represents a photocoupler, which detects rotation of a pulse plate 36 interlocked with the lens driving member 34 and transmits the detection result to a lens focusing circuit 110. The lens focusing circuit 110 drives the lens driving motor 33 by a predetermined amount, based on the foregoing information about the rotation and information about a lens drive amount from the camera side, to move the taking lens 1 to the in-focus position. Numeral 37 stands for mount contacts serving as an interface between the camera and the lens, which are well known.

Numeral 27 designates a posture detection switch such as a mercury switch or the like, which detects a posture of the camera, whether the camera is set in a horizontal posture or in a vertical posture.

In FIGS. 2A, 2B, numeral 41 denotes a shutter release button. Numeral 42 represents a monitor LCD as an external monitor display unit, which consists of a fixed segment display section for display of predetermined patterns and a 7-segment display section for display of variable numerals. Numeral 44 indicates a mode dial, which permits the photographer to select either of photographic modes and others. When the photographer brings either of indications on the mode dial to an index 43 engraved on the main body of the camera, a photographic mode corresponding to the selected indication is set. For example, the photographer is allowed to set either of the following photographic modes: a lock position to disable the camera, a position of an automatic photographing mode under control of a preset photographing program, a manual photographing mode allowing the photographer to set photographing conditions, program AE, shutter priority AE, aperture priority AE, depth-of-field priority AE, and manual exposure. The mode dial 44 also includes a "CAL" position for input of visual axis. When the photographer selects the "CAL" position and manipulates an electronic dial 45 described below, the photographer can select either of ON/OFF of visual axis input, and execution and selection of calibration.

Numeral 45 designates the electronic dial, which is rotated by the photographer to generate click pulses to select either of setting values, which can be selected further in a mode selected through the mode dial 44. For example, let us suppose that the photographer selected the shutter priority photographic mode through the mode dial 44. A shutter speed currently set is displayed in the in-finder LCD 24 and in the monitor LCD 42. As the photographer rotates the electronic dial 45 while viewing this display, the shutter speed currently set is changed in order according to the direction of rotation.

Since the other operating members have no direct relation with the present invention, the description thereof is omitted herein.

FIGS. 4A and 4B are block diagrams showing an electric configuration built in the single-lens reflex camera of the above structure, in which the same numerals denote the same elements as those in FIG. 1.

Connected to a central processing unit (hereinafter referred to as CPU) 100 of a microcomputer built in the camera body, are a visual axis detection circuit 101, a photometry circuit 102, an autofocus detection circuit 103, a signal input circuit 104, an LCD drive circuit 105, an LED drive circuit 106, an IRED drive circuit 107, a shutter control circuit 108, and a motor control circuit 109. Signals are transmitted through the mount contacts 37 shown in FIG. 1, to or from the focusing circuit 110 and stop drive circuit 111 mounted in the taking lens 1.

An EEPROM 100a attached to the CPU 100 has a memory function for storing visual axis correction data for correction for the individual difference of visual axis, as storage means.

The visual axis detection circuit 101 converts a signal of an eye image from the image sensor 14 (CCD-EYE) into digital image data by A/D conversion and transmits the image data to the CPU 100. The CPU 100 extracts characteristic points of the eye image necessary for the detection of visual axis according to a predetermined algorithm and calculates the photographer's visual axis from positions of the respective characteristic points. The photometry circuit 102 amplifies signals from the photometry sensor 10, thereafter performs logarithmic compression and A/D conversion thereof, and then sends resultant signals as luminance information of the respective sensor segments to the CPU 100. The photometry sensor 10 consists of six photodiodes, SPC-L2, SPC-L1, SPC-C, SPC-R1, SPC-R2, and SPC-M, for metering the six regions in the finder screen (corresponding to the regions 60 to 65 in FIG. 3), and thus can perform so-called divided metering.

The line sensor 6f is a known CCD line sensor consisting of five sets of line sensors CCD-L2, CCD-L1, CCD-C, CCD-R1, CCD-R2 corresponding to the five focus detection areas in the screen, shown in foregoing FIG. 3. The autofocus detection circuit 103 performs A/D conversion of voltages from the above line sensor 6f and sends resultant signals to the CPU 100.

SW1 is a switch turned on by a first stroke of the release button 41 to initiate photometry, AF, visual axis detection operation, etc., and SW2 a release switch turned on by a second stroke of the release button 41. SW-DIAL1 and SW-DIAL2 are dial switches provided in the electronic dial 45 described above, and pulses from the dial switches are fed to an up-down counter of the signal input circuit 104 to count clicks of rotation of the electronic dial 45. SW-ANG27 is a posture detection switch, and the posture of the camera is detected based on a signal from the posture detection switch.

States of these switches are fed to the signal input circuit 104 and sent through a data bus to the CPU 100.

The LCD drive circuit 105 is of known structure for display driving of the LCDs as liquid crystal display devices, and can implement simultaneous display of indications of an aperture value, a shutter time, a set photographic mode, etc. on both the monitor LCD 42 and the in-finder LCD (F-LCD) 24 according to signals from the CPU 100. The LED drive circuit 106 controls lighting/blinking of the illumination LED (F-LED) 25 and the superimposing LEDs 21. The IRED drive circuit 107 selectively lights the IREDs 13a to 13h and controls their illumination power by changing output currents (or pulse counts) to the IREDs 13a to 13h according to a command from the CPU 100.

The shutter control circuit 108 controls a magnet MG-1 for running the leading curtain with energization and a magnet MG-2 for running the trailing curtain with energization to expose the photosensitive member to a predetermined amount of light. The motor control circuit 109 is a circuit for controlling a motor M1 for winding/rewinding of the film and a motor M2 for driving of the main mirror 2 and charging of the shutter 4.

The series release sequence operation of the camera is performed by the shutter control circuit 108 and the motor control circuit 109.

The following will describe the operation of the camera of the above structure with the visual axis detecting apparatus, using the flowchart of FIG. 5.

When the photographer rotates the mode dial 44 to bring the camera from a non-operating state into a predetermined photographic mode (the present embodiment will describe an example in which the photographic mode is shutter priority AE), the power of the camera is turned on (step #100) and all variables used for the detection of visual axis are reset except for the calibration data of visual axis stored in the EEPROM 100a of the CPU 100 (step #101). Then the camera stands by before the release button 41 is depressed to the on position of the switch SW1 (step #102).

When the signal input circuit 104 detects the on state of the switch SW 1 with a press on the release button 41, a 6-second photometry timer starts. During this period the camera is in continuous operation to repeat capturing and calculation of photometric values of field light in the camera by the photometry sensor 10, the photometry circuit 102, and the CPU 100, and always provides up-to-date photometry calculated values, i.e., the indication 51 of shutter time and the indication 52 of aperture value of the taking lens on the in-finder F-LCD 24 and the external monitor LCD 42.

At the same time as the on action of the switch SW1 to activate the photometry timer, the CPU 100 detects through the signal input circuit 104 whether the input of visual axis is on or off in the setting of the mode dial 44 shown in FIGS. 2A, 2B (step #103). When the visual axis input is set in an off state, i.e., in the visual axis prohibition mode, or when the visual axis detection detailed hereinafter ends unsuccessfully, a specific focus detection area is selected by a focus detection area automatic selection subroutine without use of the visual axis information (step #116). Then the autofocus detection circuit 103 performs the focus detection operation in this focus detection area (step #107).

There are several conceivable methods as algorithms for the automatic selection of the focus detection area, and an effective algorithm among them is a near point priority algorithm with a weight on a center focus detection area, which is publicly known in the field of multipoint AF cameras.

When at above step #103 the operating mode of the camera is set in the visual axis detection mode for executing the visual axis detection operation, which calibration data is to be used in the visual axis detection is checked at the visual axis detection circuit 101. Further, when it is verified that calibration data of visual axis corresponding to the calibration data number is set at a predetermined value and the data is one entered by the photographer, the visual axis detection circuit 101 executes the visual axis detection according to the calibration data to convert the visual axis to coordinates of the visual axis position on the focusing screen 7 (step #104).

The visual axis detection operation at above step #104 will be detailed later. It is then determined whether the visual axis detection carried out at above step #104 was successfully done (step #105). Determination conditions herein are the reliability of the Purkinje images as corneal reflex images and the position of the pupil center, an angle of rotation of the eye, and so on. When the result of detection is unsuccessful, the flow proceeds to the focus detection area automatic selection subroutine of step #116. When the visual axis detection ends successfully, the CPU 100 selects a focus detection area corresponding to five or three visual-axis effective regions to which the visual axis position coordinates belong (step #106). Then the autofocus detection circuit 103 executes the focus detection in the focus detection area selected at step #106 or at step #116 (step #107).

Then, whether it is possible to perform the focus detection in the focus detection area selected by the above flow is determined based on signals from the CCD line sensor in the state before execution of lens driving (step #108). When the focus detection is possible, the CPU 100 sends a signal to the lens focusing circuit 110 to drive the taking lens 1 by a predetermined amount (step #109).

It is further determined whether the taking lens 1 is in focus in the predetermined focus detection area after the driving of the taking lens (step #110). When the taking lens is in focus, the CPU 100 sends a signal to the LCD drive circuit 105 to light the in-focus mark 53 of the in-finder LCD 24 and also sends a signal to the LED drive circuit 106 to light the superimposing LED 21 corresponding to the in-focus focus detection area, thereby providing in-focus display by the glowing focus detection area (step #111).

When the focus detection is judged impossible at above step #108, or when at step #110 a failure in focusing is determined in the in-focus determination after the driving of the lens, the CPU 100 sends a signal to the LCD drive circuit 105 to blink the in-focus mark 53 of the in-finder LCD 24, thereby informing the photographer of the failure in focusing to the subject (step #117). Then the camera stands by before the switch SW1 is once turned off and again turned on (step #118).

Returning herein to step #111, after the in-focus display of the taking lens 1, the CPU 100 determines whether the on state of the photometry timer activated at step #102 is continuously maintained (step #112). When the photographer viewing the display in the finder indicating the focus detection area in focus judges that the focus detection area is incorrect or determines suspension of photography, the photographer frees the release button 41 to turn off the switch SW1, whereupon the flow returns to step #102 to wait for the on state of the switch SW1.

On the other hand, when the photographer checks the focus detection area under the in-focus display and continuously keeps the on state of the switch SW1, the CPU 100 makes the photometry circuit 102 execute measurement of luminance of the field to determine an exposure value of the camera (step #113). If the photographer further pushes the release button 41 to turn on the switch SW2 (step #114), the CPU 100 sends signals to the shutter control circuit 108, the motor control circuit 109, and the stop drive circuit 111 to perform the known shutter release operation (step #115).

Specifically, first, the motor M2 is powered through the motor control circuit 109 to move the main mirror 2 up, the stop 31 is narrowed, and thereafter the magnet MG-1 is energized to open the leading curtain of the shutter 4. The aperture value of the stop 31 and the shutter speed of the shutter 4 are determined from the exposure value detected by the photometry circuit 102 and the film speed of the film 5. After a lapse of a predetermined shutter time (1/125 sec), the magnet MG-2 is energized to close the trailing curtain of the shutter 4. After completion of exposure to the film 5, the motor M2 is again powered to move the mirror down and charge the shutter, and the motor M1 for feeding of the film is also powered to feed the film by a frame, thereby completing the operation of the series shutter release sequence.

After that, the camera stands by before the switch SW1 is again turned on (step #102).

Figure 6:
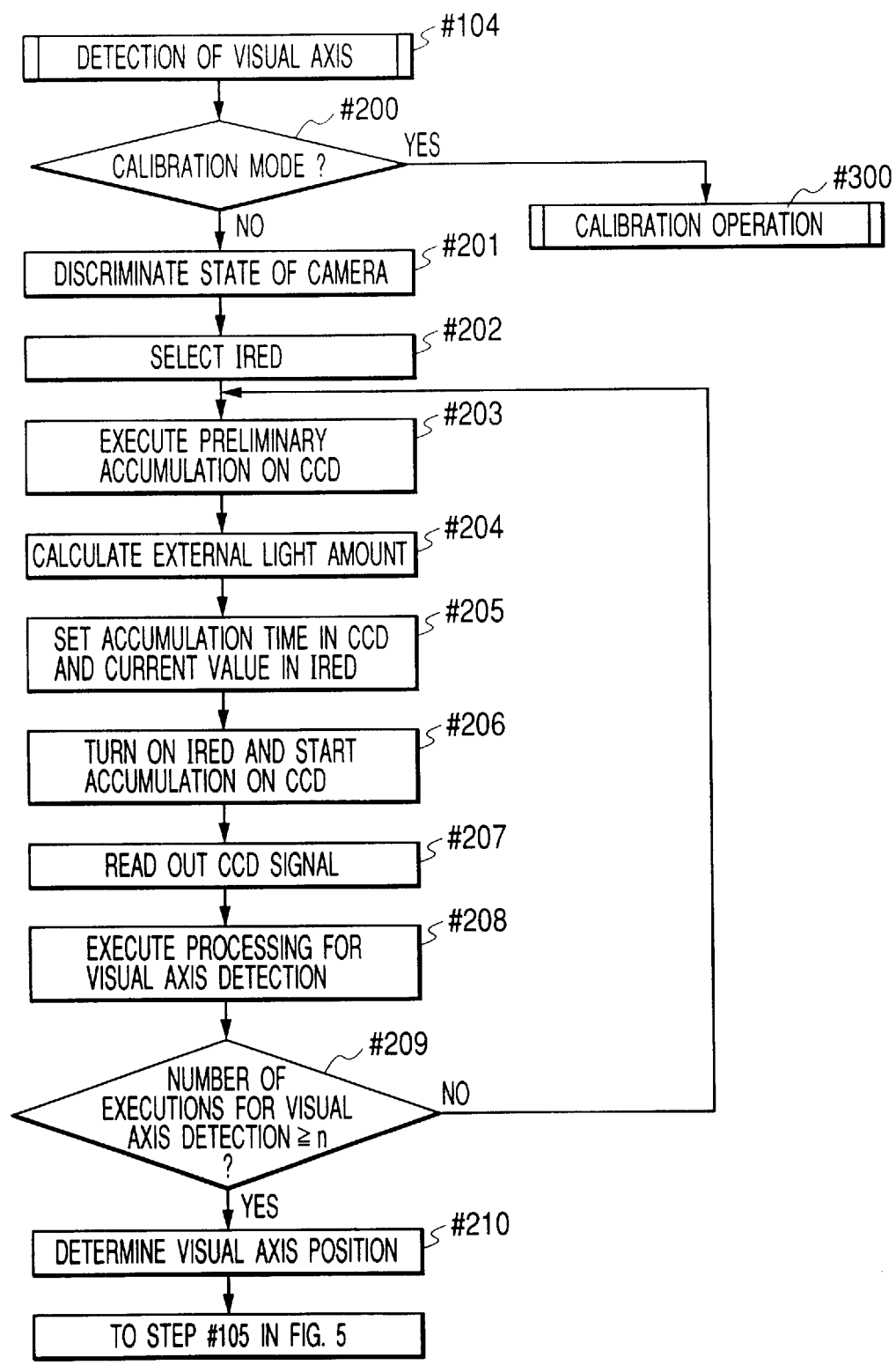
FIG. 6 is a flowchart showing the visual axis detection operation at step #104 in FIG. 5.

FIG. 6 is a flowchart showing the visual axis detection operation algorithm.

In FIG. 6, as described previously, the visual axis detection circuit 101 executes the visual axis detection when receiving a signal from the CPU 100 (step #104). The visual axis detection circuit 101 determines whether the detection of visual axis is that in the photographic mode or that in the calibration mode of visual axis (step #200).

In reality, the visual axis detection circuit 101 executes the calibration (CAL) operation described below when the mode dial 44 in FIGS. 2A, 2B is set in the calibration mode for the visual axis detection operation (step #300).

The mode dial 44 includes a setting of the visual axis detection mode and at this setting position, the photographer can manipulate the electronic dial 45 of FIGS. 2A, 2B to select one of settings of four positions in total: calibration data numbers 1, 2, and 3 permitting registration and execution of calibration data for three persons, and OFF disabling the visual axis detection.

When the camera is not set in the calibration mode, the visual axis detection circuit 101 identifies the current calibration data number in the camera.

Subsequently, the visual axis detection circuit 101 first detects through the signal input circuit 104 in what posture the camera is set, in the case of the visual axis detection in the photographic mode (step #201). The signal input circuit 104 processes an output signal from the posture detection switch 27 (SW-ANG) in FIG. 1 to determine whether the camera is in the horizontal posture or in the vertical posture and also determine in the case of the vertical posture whether the release button 41, for example, is on the sky side or on the ground side.

Then two IREDs are selected out of those 13a to 13h on the basis of the posture information of the camera detected previously and photographer's spectacles information included in the calibration data (step #202). For example, when the camera is set in the horizontal posture and the photographer does not wear spectacles, the IREDs 13a, 13b shown in FIG. 2B are selected. When the camera is in the horizontal posture and the photographer wears spectacles, the IREDs 13c, 13d with a wider spacing than that between the IREDs 13a, 13b are selected in order to decrease influence of reflected light from the photographer's spectacles.

When the camera is set in the vertical posture, for example, with the release button 41 being located on the sky side or on the ground side, the IREDs selected are a combination of IREDs to illuminate the photographer's eye from underneath, i.e., a combination of IREDs 13a, 13f for the photographer without spectacles, or a combination of IREDs 13c, 13e for the photographer with spectacles.

Then preliminary accumulation (pre-accumulation) of charge is carried out prior to full accumulation of charge on the image sensor 14 (hereinafter referred to as CCD-EYE) (step #203). The pre-accumulation on the CCD-EYE 14 is an operation of constantly taking in an image signal for an accumulation period of a fixed duration, e.g., 1 ms immediately before the full accumulation. By controlling an accumulation period for capturing an actual eye image according to the magnitude of the signal level of the pre-accumulation, it becomes feasible to obtain a stable eye image signal. Namely, brightness near the observer's eye (amount of external light) is measured based on the image signal output of pre-accumulation (step #204).

Next, the accumulation period of the CCD-EYE 14 and the illumination power of the IREDs are set based on the external light amount determined at step #204, the information about whether the photographer wears spectacles, or the like (step #205). After the accumulation period of the CCD-EYE 14 and the illumination power of the IREDs are set, the CPU 100 makes the IRED drive circuit 107 light the IREDs 13 at the predetermined power and the visual axis detection circuit 101 starts accumulation of charge on the CCD-EYE 14 (step #206). The accumulation here is completed according to the accumulation period of the CCD-EYE 14 previously set and, at the same time as it, the IREDs 13 are also turned off.

Then image signals stored in the CCD-EYE 14 are successively read out to be subjected to A/D conversion in the visual axis detection circuit 101, and the resultant digital signals are stored in the memory of the CPU 100 (step #207).

The principle of the visual axis detection will be briefly described below with reference to FIGS. 7 and 8.

Figure 7:
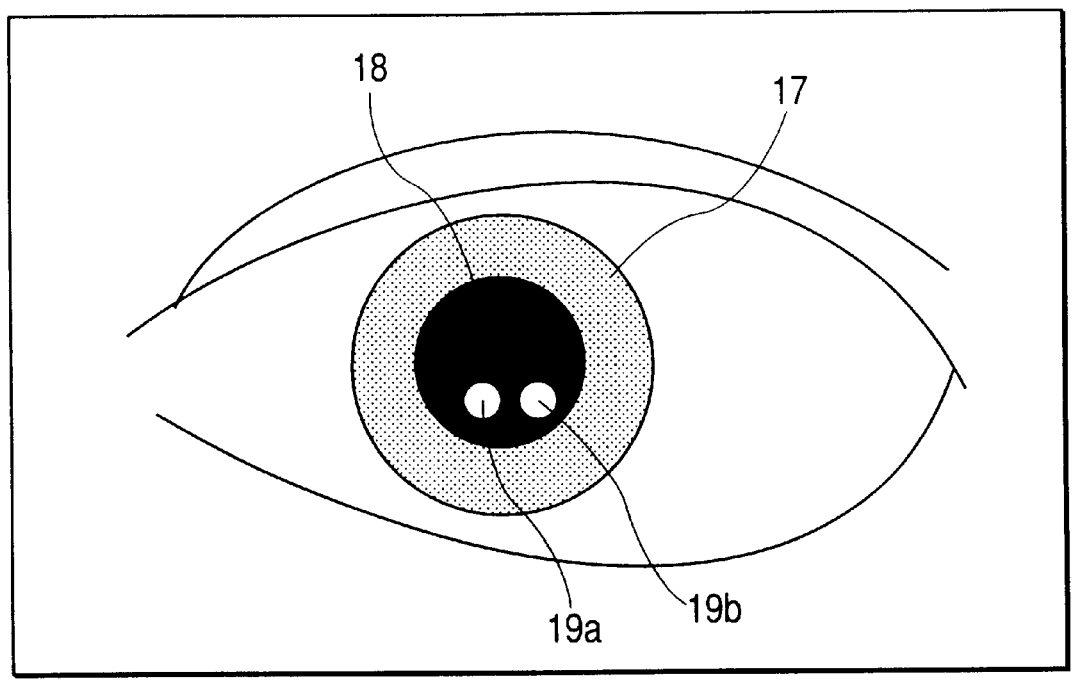
FIG. 7 is an illustration for explaining the general principle of visual axis detection.
Figure 8:
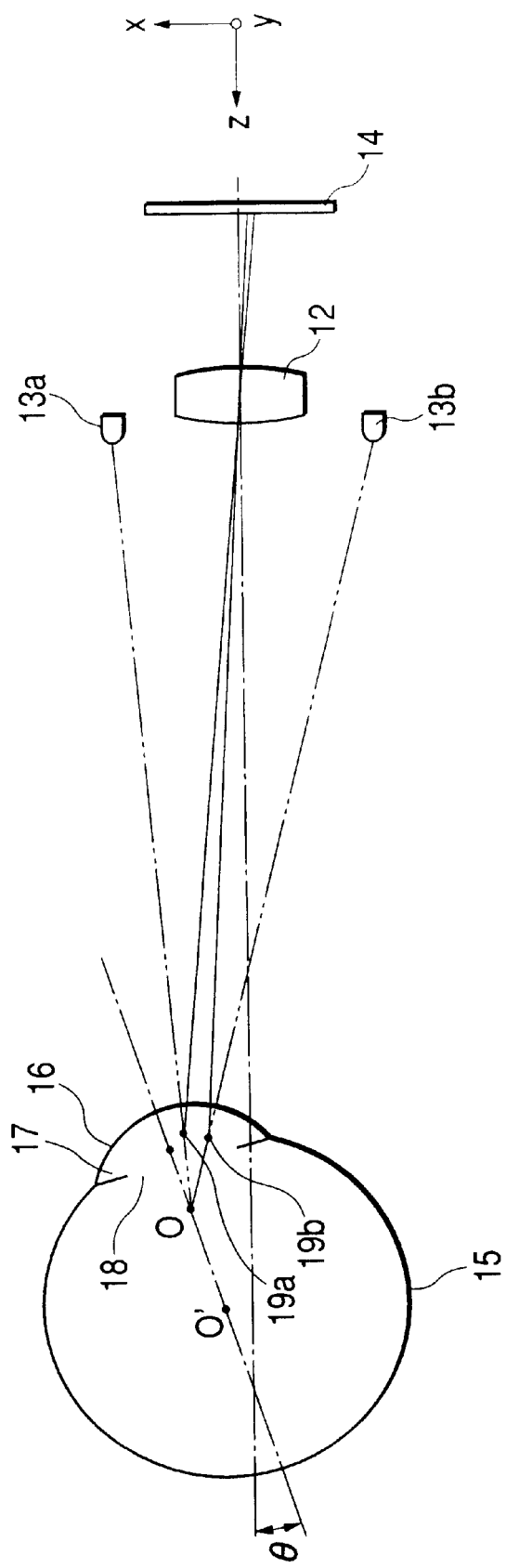
FIG. 8 is also an illustration for explaining the general principle of visual axis detection.

FIG. 7 shows an image obtained from the eye image signals of the CCD-EYE 14. If the IREDs 13a and 13b emit light, the cornea 16 of the eye 15 in FIG. 8 form Purkinje images 19a, 19b shown in FIGS. 7 and 8. Numeral 17 designates the iris and 18 the pupil.

Returning to FIG. 6, these image signals are subjected to known visual axis detection processing (step #208). Namely, the CPU 100 detects positions of the Purkinje images 19a, 19b which are virtual images of the pair of IREDs 13a, 13b used for illumination of the eye.

As described previously, the Purkinje images 19a, 19b appear as luminescent spots with strong optical power. Therefore, the Purkinje image can be detected in such a way that a predetermined threshold is set as to optical power and images with optical power over the threshold are determined as Purkinje images. The position of the center of the pupil can be calculated by detecting a plurality of boundary points between the pupil 18 and the iris 17 and fitting the boundary points to a circle by least mean square approximation. A rotational angle θ of the eye is obtained from the positions of these Purkinje images and the position of the center of the pupil. The distance between the eyepiece lens 11 of the camera and the photographer's eye 15 is further calculated from the spacing between the two Purkinje images 19, and an image magnification β of the eye image projected onto the CCD-EYE 14 can be obtained based thereon.

Using the rotational angle θ of the eye and the image magnification β and also using the individual difference correction information obtained by the calibration, as described above, it is possible to determine coordinates of a position where the photographer's visual axis direction falls on the focusing screen 7.

Returning to FIG. 6, it is determined how many times the visual axis detection operation from step #203 to step #208 has been executed (step #209). If the number of executions of the visual axis detection does not reach a number n determined based on a distribution of photographer's gazing points during the calibration described later, the flow returns to step #203 to execute the visual axis detection again. When the number of executions reaches n, averages are calculated to determine a final visual axis position, using values of coordinates x, y of the position of the photographer's visual axis direction on the focusing screen 7, obtained through the n visual axis detection operations (step #210). This part is a portion of determining the visual axis position. Once the visual axis position is determined, the flow returns to the determination part to determine whether an area is selected by the visual axis, at step #105 in FIG. 5, a visual-axis effective region is determined according to the visual axis position, and a focus detection area is determined according to the effective region.

The calibration operation algorithm will be described below, using the flowchart of FIG. 9.

As described previously, the calibration is an operation of letting the photographer fix the view at each of the right-end dot mark 74' and the left-end dot mark 70' in the focus detection areas in the finder field for a fixed period and sampling visual axis correction data from eye image data obtained thereby. In the present embodiment this calibration operation itself is a means for determining the number of executions of the visual axis detection in the aforementioned visual axis detection algorithm of FIG. 6.

When the mode dial 44 is set at the "CAL" position, the calibration operation starts (step #300).

At the first step, in what posture the camera is set is detected through the output signal of the posture detection switch 27 (SW-ANG) and the signal input circuit 104 (step #301). This is the same detection process as the step #201 in FIG. 6. Then the right-end dot mark 74' of the focus detection area in the finder field is blinked to present a target to fix the photographer's view (step #302). At the same time, the calibration data stored in the EEPROM 100a is checked based on the calibration number currently set. When the data is already registered, the "CAL" indication of the monitor LCD 42 of FIGS. 2A, 2B is kept lighting as it is. When the data is not registered, the "CAL" indication is blinked.

Subsequently, the camera performs the selection operation of selecting the IREDs for illuminating the photographer's eye during the calibration (step #303). The selection operation of IREDs in this case is a little different from the operation described in FIG. 6, though they are similar in the use of the camera posture information. In the case where the calibration was performed in the past and the camera already stores the calibration data, the set of IREDs stored, i.e., either the set for the photographer with spectacles or the set for the photographer without spectacles (naked eye) is selected according to the stored information from the beginning. On the other hand, in the case of the first calibration, there is no information to select either the set of IREDs for the photographer with spectacles or the set of IREDs for the photographer without spectacles, and thus the set of IREDs for the photographer without spectacles are selected and activated in the first eye image illumination in the calibration to determine whether there appears a ghost due to reflection from the spectacles in the eye image signals from the CCD as described hereinafter. When the spectacles ghost is detected by the detection, the IRED set is changed to the set of IREDs for spectacles in the second illumination and illumination thereafter.

At step #303, the set of IREDs to emit light are determined, and the camera awaits an on signal of the switch SW1 pressed by the photographer. When the on signal of the switch SW1 is detected, the camera performs the same eye image capturing operation as the operation from step #205 to step #207 described with the flowchart of FIG. 6.

Namely, the accumulation period of the CCD-EYE 14 and the illumination power of the IREDs 13 are set (step #304), accumulation on the CCD-EYE 14 and illumination by the IREDs 13 is actually carried out (step #305), image signals accumulated on the CCD-EYE 14 are successively read out, and digital signals after A/D conversion are stored in the memory of the CPU 100 (step #306). Then the CPU 100 calculates the rotational angle θ of the photographer's eye according to a specified computation equation, using the image signals obtained by the A/D conversion and stored on the memory (step #307).

During the eye image capturing operation the blinking of the right-end dot mark 74' of the focus detection area in the finder field is changed to a lighting indication, thereby informing the photographer of the progress of execution of the eye image capturing operation.

Subsequently, the rotational angle è thus calculated is subjected to determination to determine whether the value is valid (step #308). Since it is biologically rare that the optical axis of the eye deviates by several ten degrees from the visual axis, the threshold for the determination herein is set to ±10. This step #308 is a step of simply determining whether the detected rotational angle of the eye is valid or not, and the flow proceeds to next step #309, regardless of the result of the determination, to determine whether the count of detections is less than 10. When the total number of detections of the eye rotation angle is less than 10, the flow returns to step #304 to perform the eye image capturing operation again. When the total number of eye rotation angle detections reaches 10, whether the calibration (CAL) was successfully done or not is then determined based on how many operations were successful among the ten detections (step #310).

Figure 10A:
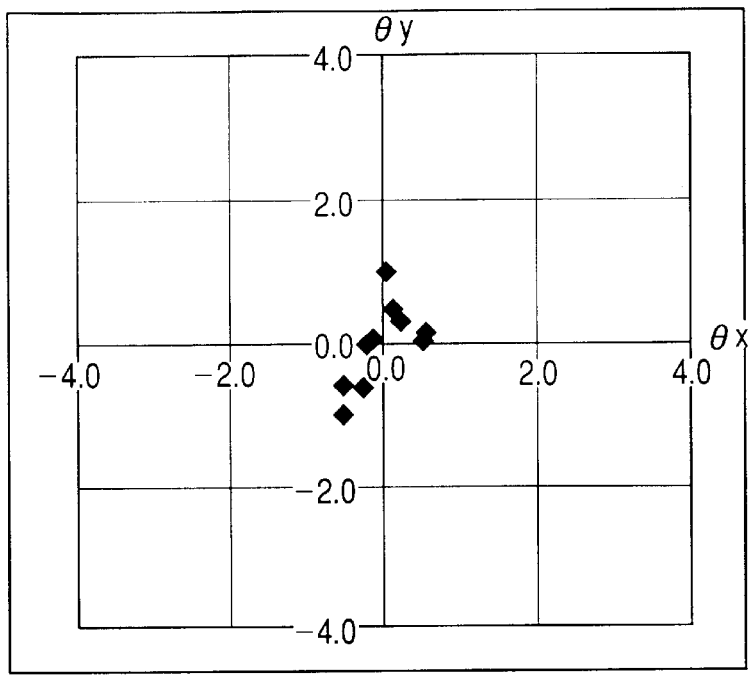
FIGS. 10A and 10B are gazing point distribution charts associated with the first embodiment of the present invention.
Figure 10B:
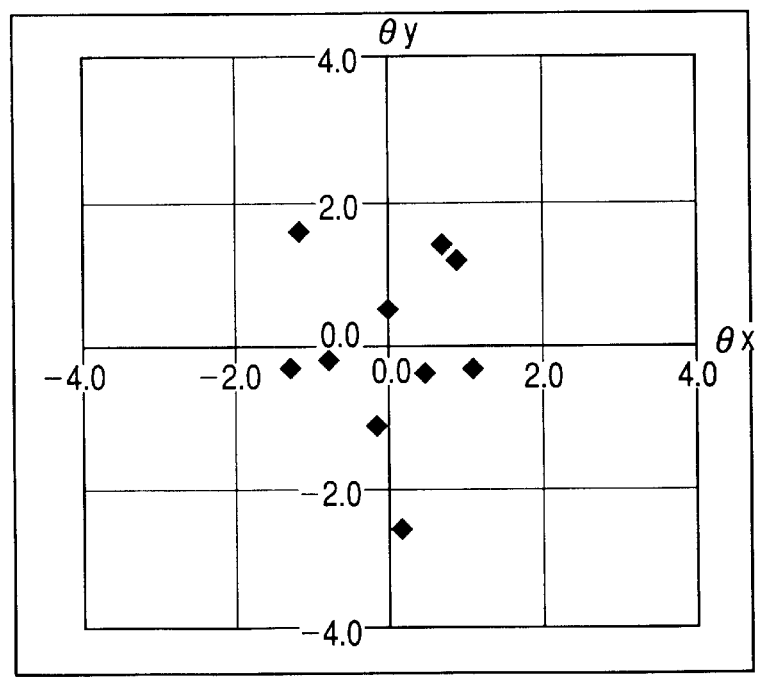

In this example the calibration with the right-end mark 74' is judged successful with five or more success results in the detections of rotational angle, and the calibration operation with the left-end mark 70' is then started. After the calibration with the left-end mark 70' is successfully done in a similar fashion, a distribution of gazing points (more accurately, gazing rotational angles) is obtained at each of the right-end mark 74' and the left-end mark 70'. FIG. 10A and FIG. 10B show an example of the distribution.

FIGS. 10A and 10B are plots in the θx, θy coordinate system of successful data in all the ten detections of rotational angle in the calibration with the right-end mark 74' carried out by each of two calibration subjects of the camera, a photographer a and a photographer b. The plots in FIGS. 10A and 10B are distributions centered around the origin as an average, because the averages of ten data for each of θx and θy are made coincident with the origin of the θx, θy coordinate system for convenience' sake.

As apparent from FIGS. 10A and 10B, the photographer b demonstrates greater variations of gazing points even in gazing at one point (the mark 74' in this case) than the photographer a. For quantification of these gazing point distributions, a standard deviation is calculated for each of θx and θy (step #311). The standard deviation σ is calculated according to the equation below (the following equation is for θx).

$$\sigma = \sqrt{\frac{\sum_{i=1}^{n}(xi - xav)^2}{n-1}}$$

where, $$xav = \frac{\sum_{i=1}^{n} xi}{n}$$

Therefore, according to the above equation, x-directional and y-directional standard deviations with the gazing point at the mark 74' can be calculated as σRx and σRy, respectively, and x-directional and y-directional standard deviations with the gazing point at the mark 70' as σLx and σLy, respectively. Since in the present camera the visual-axis effective regions 60 to 64 to be selected by the visual axis detection are arranged only in the horizontal direction, the standard deviation indicating only the x-directional gazing point distribution "σx=(σRx+σLx)/2" is defined herein and the following description will be given based thereon.

At the next step, the calculated standard deviation σx of the x-directional gazing point distribution is compared with a threshold (step #312). The threshold herein is 0.70°. In fact, it is possible to select one of the regions 60 to 64 to be selected by the visual axis detection if half of the distance between the centers of two adjacent regions (about 2° as a visual axis angle herein) can be separated. Since the result of visual axis detection is also affected actually by other factors besides the variations during gazing: e.g., differences in photographer's viewing into the finder, errors in the calibration, errors in the visual axis detection, and so on, the threshold herein is set at the exacting value.

Let us suppose "σx=σRx" for convenience of description. Then the standard deviation σx is equal to 0.39 for the photographer a and is thus below the threshold of 0.7. Therefore, the photographer a is judged as a person with little variation in the gazing point distribution, n=1 is determined as the number of executions of the visual axis detection (the number of actual detections) in the execution of the visual axis detection operation described in FIG. 6, and the number is stored in the EEPROM 100a (step #313).

On the other hand, the standard deviation σx is equal to 0.85 for the photographer b and is thus over the threshold of 0.7. Therefore, the photographer b is judged as a person with great variation in the gazing point distribution, n=3 is determined as the number of executions of the visual axis detection, and the number is stored in the EEPROM 100a (step #314).

Figure 11A:
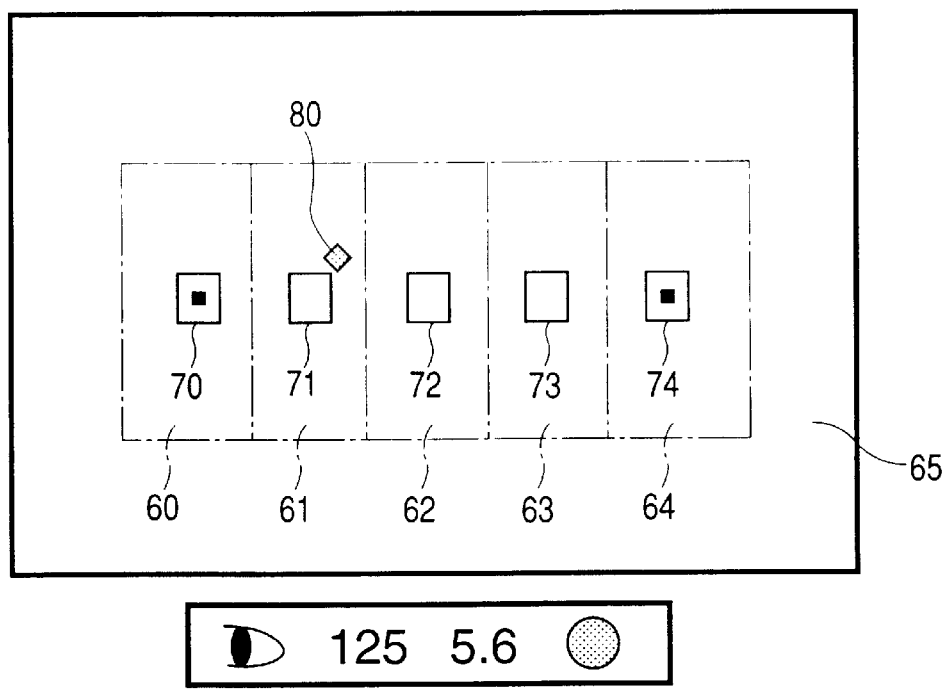
FIGS. 11A and 11B are illustrations for explaining visual axis selection areas associated with the first embodiment of the present invention.
Figure 11B:
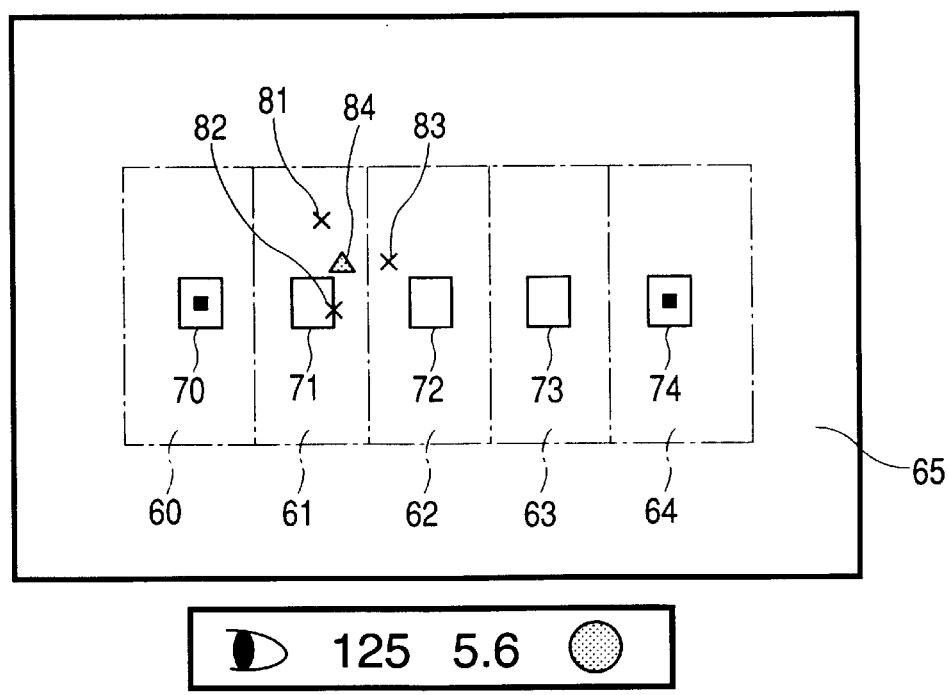

FIGS. 11A and 11B are illustrations for explaining selection of visual-axis effective region 61 as the results of the actual visual axis detections carried out by the photographers a, b described with foregoing FIGS. 10A and 10B.

In FIG. 11A, since the photographer a is judged as a person with little variation in the gazing point distribution by the gazing point distribution sampling means in the calibration, a coordinate point 80 on the focusing screen 7, detected by only the visual axis detection of n=1, is determined as the visual axis position as it is, so that the visual-axis effective region 61 to which the coordinate point belongs is selected.

On the other hand, in FIG. 11B, since the photographer b is judged as a person with great variation in the gazing point distribution, the visual axis detection is executed n=three times, so that coordinate points 81, 82, 83 on the focusing screen 7 are detected as visual axis positions. Then an average coordinate point 84 of the X, Y coordinate values of the coordinate points 81, 82, 83 are determined as a final visual axis position, and the visual-axis effective region 61 to which the average coordinate point belongs is selected.

Referring back to FIG. 9, after the number of executions of the visual axis detection is determined through step #313 and step #314, the "CAL" indication of the monitor LCD 42 is turned to the lighting indication meaning success in the calibration and the calibration data is stored in the memory of the CPU 100. With success in the calibration, the CPU 100 stores in the EEPROM 100a of the CPU 100, the visual axis correction data for correction for the detection error of visual axis due to the individual difference of photographer's eye, which was obtained by the calibration. If there exists calibration data already registered, the newly sampled calibration data is unified with the past data stored (step #316).

When at above step #310 the number of successful detections of the rotational angle is less than 5, the calibration CAL is judged as failure, and the "CAL" indication of the monitor LCD 42 is turned into the blinking indication, thereby informing the photographer of the failure in the calibration (step #315).

In the above description the standard deviation of coordinates in the photographer's gazing point distribution was calculated in order to determine the number of executions of the visual axis detection, but it may also be determined by a statistical work of variance value or the like besides the standard deviation.

In the above description the value of the number of executions of the visual axis detection determined from the standard deviation of coordinates in the gazing point distribution was stored corresponding to the calibration number in the EEPROM 100a, but it is also possible to employ a configuration wherein the value of the standard deviation itself is stored, the CPU 100 is configured to read the standard deviation value during actual execution of the visual axis detection in photography with the camera, and the number of executions of the visual axis detection is determined on the spot.

Further, a more practical configuration is such that the number of executions of the visual axis detection and the standard deviation both are stored and the latest value of the number of executions of the visual axis detection is updated from a new standard deviation value and the past standard deviation values obtained in repetition of the calibration.

First Embodiment

Since the first embodiment described above employs the configuration having the means (#311) for performing the gazing point distribution operation for obtaining a plurality of visual axis position information pieces with the observer gazing at an identical position; and the means (#312 to #314, #210, #106) for varying the number of executions of the visual axis detection, based on the output from the foregoing means, and determining the observer's visual axis position from one or more visual axis position information pieces obtained, it is feasible to permit each person using the device to select an intended area while minimizing the influence of variation in the visual axis position due to the individual difference of gazing ability.

Second Embodiment

Figure 12:
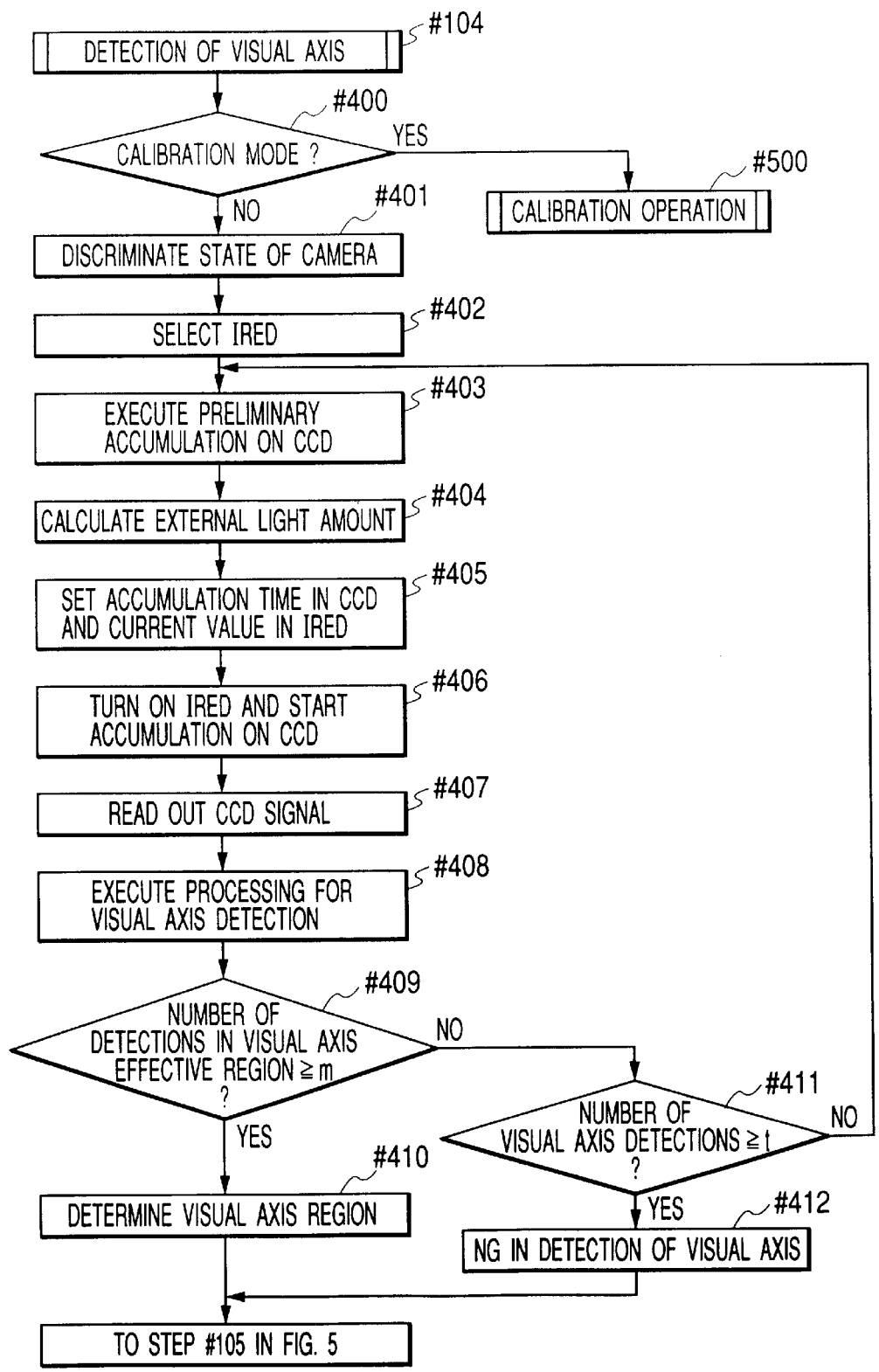
FIG. 12 is a flowchart showing the visual axis detection operation of the camera in a second embodiment of the present invention.
Figure 13:
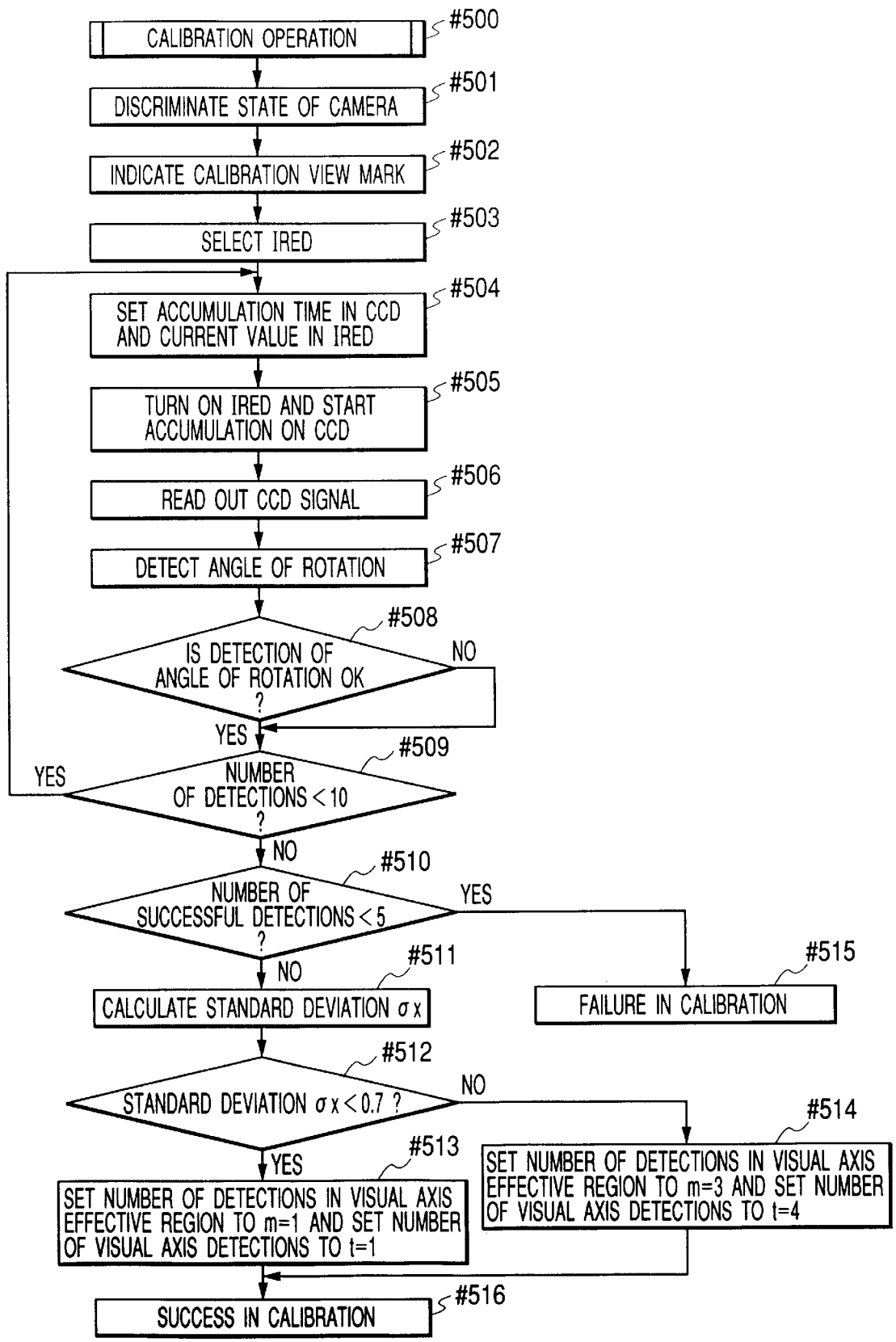
FIG. 13 is a flowchart showing the calibration operation of the camera in the second embodiment of the present invention.

FIGS. 12 and 13 are flowcharts showing the operation of the major part associated with the second embodiment of the present invention. FIGS. 1 to 5, described in the above first embodiment, are also common to the camera of the second embodiment.

FIG. 12 is the flowchart showing the visual axis detection operation algorithm of the camera according to the second embodiment of the present invention, in which steps #104, and #400 to #408 are the same as the steps #104, and #200 to #208 in the flowchart of FIG. 6 in the first embodiment and thus will not be described herein.

After coordinates of photographer's visual axis positions are determined by the visual axis detection processing at step #408 in FIG. 12, it is determined where the coordinates are present among the visual-axis effective regions 60 to 64 of FIG. 3. As a consequence, if the coordinates are present in one of the visual-axis effective regions, the number of presence in that visual-axis effective region is counted. When it is determined that the count in a certain area reaches m (step #409), it is assumed that the photographer selected the visual-axis effective region by the visual axis detection, and the area is determined as a selected area (step #410). Then the flow proceeds to step #105 and then to step #106 in FIG. 5, so that the focus detection area is finally selected corresponding to the visual-axis effective region selected at step #410. (Precisely, the step #105 in FIG. 5 is configured to receive the coordinates of the visual axis position, whereas the step #410 itself in the second embodiment is the means for selecting the region. Therefore, there is a slight difference in the function from step #105 described in the first embodiment.)

Referring back to step #409, when there are no coordinates of the visual axis position detected m times in either of the visual-axis effective regions, the number of visual axis detections is checked (step #411). When the number of visual axis detections reaches t, it is determined that the visual axis detection was unsuccessful (step #412) and then the flow proceeds to #105 in FIG. 5. When the number of visual axis detections is less than t, the flow returns again to step #403 to repeat the visual axis detection operation. The limit to the number of visual axis detections is given because of consideration from the aspect of response in the camera operation.

The count number m at above step #409 and the count number t at step #411 are determined by the algorithm of the calibration operation described next with FIG. 13.

Figure 9:
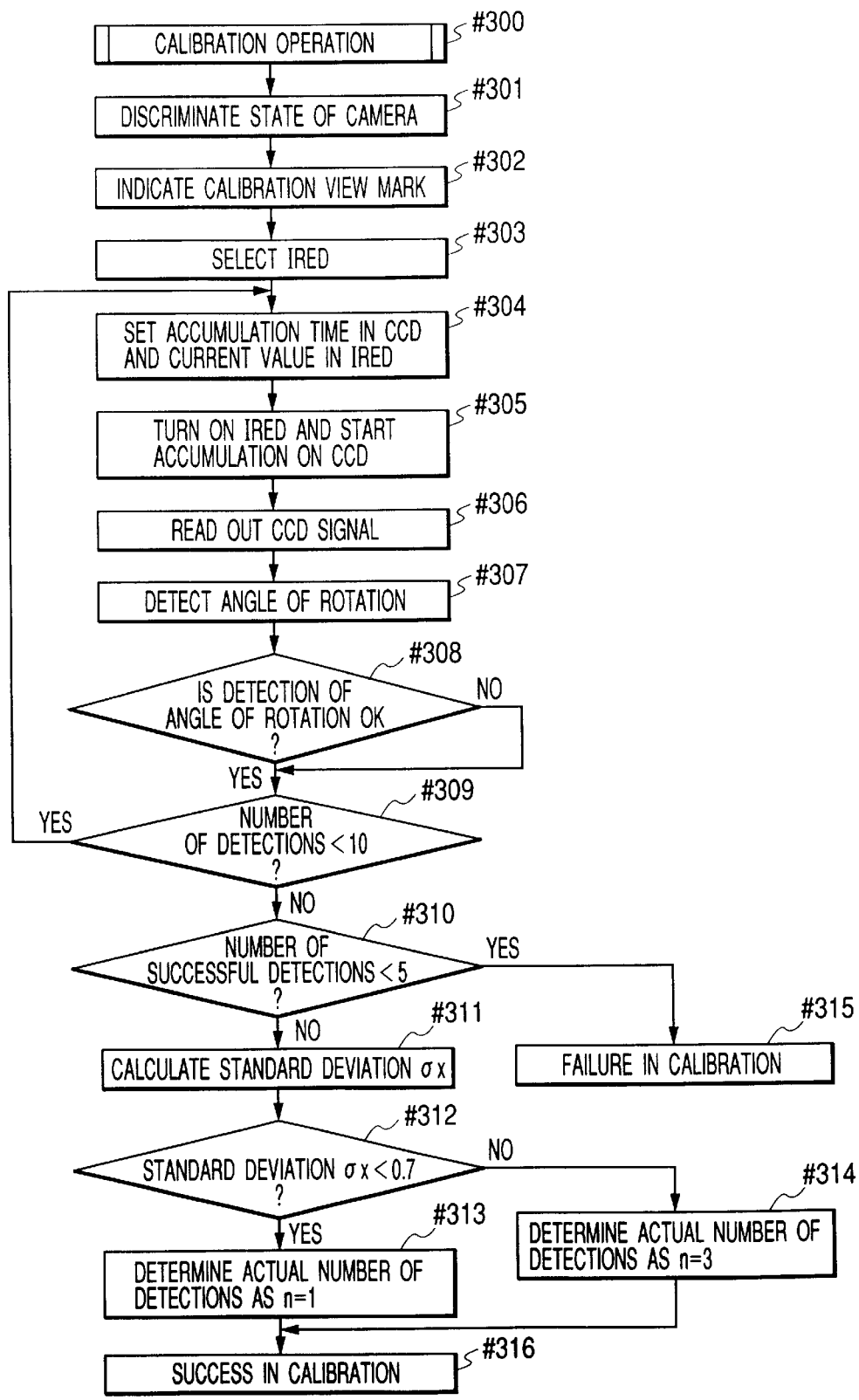
FIG. 9 is a flowchart showing the calibration operation at step #300 in FIG. 6.

In FIG. 13, step #500 to step #511 are the same as in the operation of FIG. 9 in the above first embodiment. Namely, the visual axis correction data can be obtained by execution of the calibration operation; eye rotation angles are detected ten times with the photographer gazing at each of two marks, the distribution of gazing points (more accurately, gazing angles) can also be obtained simultaneously, and the standard deviation σx is calculated from the data thus obtained (the gazing point distribution operation), which is the schematic processing up to step #511.

At next step #512, the resultant standard deviation value σx is compared with the threshold of 0.7. When the standard deviation is smaller than 0.7, the number m, which is the value for the determination at step #409 in the visual axis detection operation algorithm of FIG. 12, is set as m=1, and the number t is also set as t=1 (time) (step #513). When the standard deviation value σx is not less than the threshold of 0.7 on the other hand, the numbers m and t are determined as m=3 and t=4 (times) (step #514).

Figure 14A:
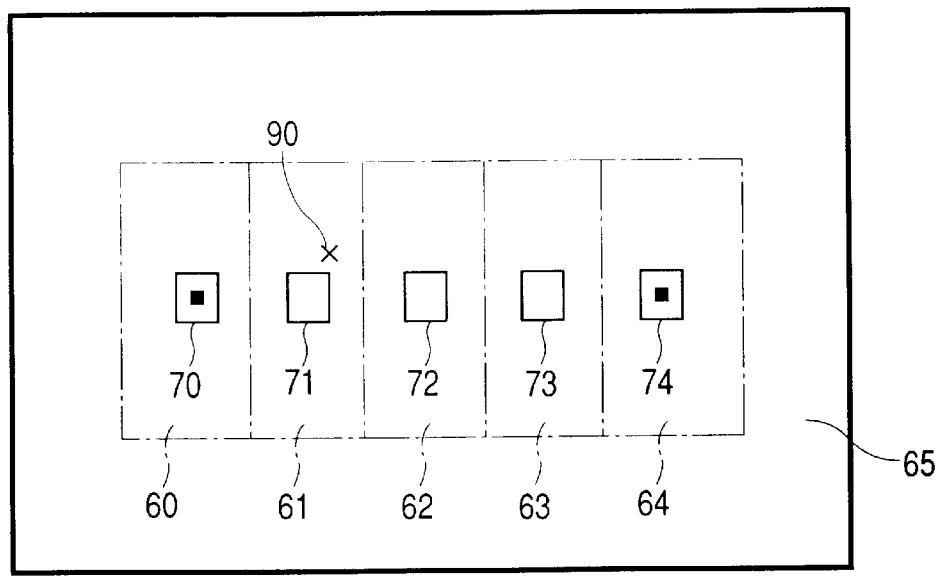
FIGS. 14A and 14B are illustrations for explaining visual axis selection areas associated with the second embodiment of the present invention.
Figure 14B:
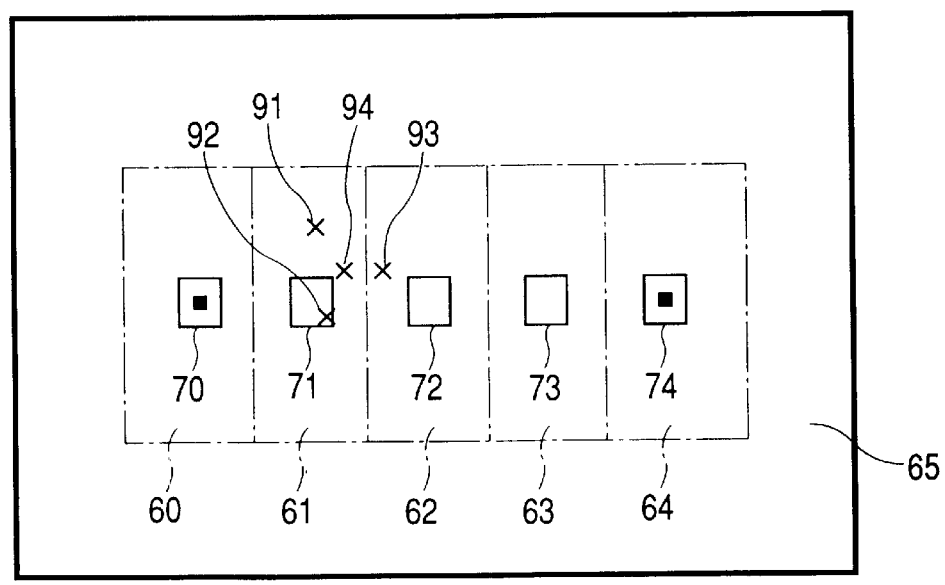

FIGS. 14A and 14B are illustrations for explaining examples in which the visual-axis effective region 61 is selected by the visual axis detection operation for a person with σx smaller than 0.7 (the photographer a in the first embodiment) and for a person with σx not less than 0.7 (the photographer b in the first embodiment).

In FIG. 14A, since the photographer a is judged as a person with little variation in the gazing point distribution by the gazing point distribution operation (#511) in the calibration, the visual-axis effective region 61, to which a coordinate point 90 on the focusing screen 7 detected by the visual axis detection of m=1 belongs, is selected as it is.

On the other hand, in FIG. 14B, since the photographer b is judged as a person with great variation in the gazing point distribution, no region is determined unless three visual axis position belong to either one of the visual-axis effective regions 60 to 64. In this example the visual axis detection operation ends at the time when a visual axis position coordinate point 94 on the focusing screen 7 is detected in the region 61. Three visual axis positions represented by coordinates 91, 92, 94 are detected in the region 61, and the position represented by a coordinate point 93 is detected in the region 62. The visual-axis effective region 61 thus satisfies the condition and is selected.

Since the second embodiment described above employs the configuration having the plurality of divisional areas (the focus detection areas in this example) in the screen to obtain the information for execution of control of various operations of the device and having the means (#511) for performing the gazing point distribution operation for obtaining a plurality of visual axis position information pieces with the observer gazing at an identical point and the means (#512 to #514, #410, #106) for determining the predetermined value on the basis of the output from the foregoing means, comparing the number of detections of the visual axis position in the divisional areas with the predetermined value, and thereby determining an area out of the plurality of areas, it is feasible to permit each person using the device to select an intended area while minimizing the influence of the variation in the visual axis position due to the individual difference of the gazing ability which is the physiological problem of men. Namely, it is feasible to execute the visual axis detection function acting satisfactorily, with good accuracy according to each person using the device.

The above embodiments described the examples of application to the single-lens reflex camera, but it is noted that the present invention can also be applied to such optical equipment as lens shutter cameras, video cameras, and so on. Further, the present invention can also be applied to devices as combination of a display with a head-mounted visual axis detection unit, and other equipment and constituent units.

As described above, the present invention provided the visual axis detection apparatus or optical equipment permitting each person using the device to select an intended area while minimizing the influence of the variation in the visual axis position due to the individual difference of gazing ability.

What is claimed is:

1. A visual axis detecting apparatus comprising:

a visual axis detection circuit for detecting a visual axis of an observer;

an arithmetic circuit for performing an arithmetic operation of calculating a distributed state of variations of visual axis positions obtained in a plurality of visual axis detections executed by the visual axis detection circuit in a state in which the observer is observing a predetermined point, with respect to said predetermined point;

a determination circuit for determining a condition of the visual axis according to the result of detection by the visual axis detection circuit; and a change circuit for changing a determination process of determining the condition of the visual axis by the determination circuit, according to the distributed state of variations.

2. The apparatus according to claim 1, further comprising:

a storage circuit for storing the distributed state calculated by said arithmetic circuit, wherein said change circuit changes the number of detections by said visual axis detection circuit to a smaller number when the distributed state of variations is small, but the change circuit changes the number of detections by said visual axis detection circuit to a larger number when the distributed state of variations is large, and wherein said determination circuit determines the condition of the visual axis on the basis of the number of detections changed by the change circuit.

3. The apparatus according to claim 2, wherein said determination circuit determines that a position of the visual axis is an average position of a plurality of visual axis positions detected by said visual axis detection circuit.

4. The apparatus according to claim 1, wherein said arithmetic circuit calculates a standard deviation of a plurality of visual axis positions.

5. The apparatus according to claim 1, wherein said predetermined point is displayed on a screen.

6. The apparatus according to claim 5, wherein a plurality of zones are displayed on said screen and a zone is selected out of said plurality of zones according to the condition of the visual axis determined by said determination circuit.

7. The apparatus according to claim 6, wherein said screen is a focusing screen of a camera.

8. The apparatus according to claim 1, further comprising:

a mode setting member for setting a mode of performing the arithmetic operation by said arithmetic circuit and a mode of performing the determination by said determination circuit.

9. A visual axis detecting apparatus comprising:

a screen in which a plurality of zones are formed;

a visual axis detection circuit for detecting a visual axis of an observer;

an arithmetic circuit for performing an arithmetic operation of calculating a distributed state of variations of visual axis positions obtained in a plurality of visual axis detections executed by the visual axis detection circuit in a state in which the observer is observing a predetermined point on said screen, with respect to said predetermined point;

a selection circuit for selecting one of said plurality of zones according to the result of detection by said visual axis detection circuit; and a change circuit for changing a selection process by said selection circuit according to the distributed state of variations.

10. The apparatus according to claim 9, further comprising:

a storage circuit for storing the distributed state calculated by said arithmetic circuit, wherein said change circuit changes the number of detections by said visual axis detection circuit to a smaller number when the distributed state of variations is small, but the change circuit changes the number of detections by said visual axis detection circuit to a larger number when the distributed state of variations is large, and wherein said selection circuit selects one of said plurality of zones on the basis of the number of detections changed by the change circuit.

11. The apparatus according to claim 10, wherein said selection circuit selects a zone located at an average position of a plurality of visual axis positions detected by said visual axis detection circuit.

12. The apparatus according to claim 9, wherein said arithmetic circuit calculates a standard deviation of a plurality of visual axis positions.

13. The apparatus according to claim 9, wherein said screen is a focusing screen of a camera.

14. The apparatus according to claim 9, further comprising:

a mode setting member for setting a mode of performing the arithmetic operation by said arithmetic circuit and a mode of performing the selection by said selection circuit.

* * * * *

UNITED STATES PATENT AND TRADEMARK OFFICE
CERTIFICATE OF CORRECTION

PATENT NO. : 6,674,964 B2
DATED : January 6, 2004
INVENTOR(S) : Yoshiaki Irie

It is certified that error appears in the above-identified patent and that said Letters Patent is hereby corrected as shown below:

Column 12,
Line 64, delete "±10" and insert -- ±10° --.

Column 13,
Line 60, delete "0.70°" and insert -- 0.7° --.

Signed and Sealed this

Twenty-first Day of February, 2006

JON W. DUDAS
*Director of the United States Patent and Trademark Office*